United States Patent [19]

Burgie et al.

[11] Patent Number: 5,401,872
[45] Date of Patent: Mar. 28, 1995

[54] TREATMENT OF VENT GAS TO REMOVE HYDROGEN CHLORIDE

[75] Inventors: Richard A. Burgie; Owen A. Heng; Tod E. Lange, all of Midland, Mich.

[73] Assignee: Hemlock Semiconductor, Hemlock, Mich.

[21] Appl. No.: 206,366

[22] Filed: Mar. 7, 1994

[51] Int. Cl.$^6$ ................................................ C07F 7/08
[52] U.S. Cl. ...................................... 556/477; 423/342
[58] Field of Search .......................... 556/477; 423/342

[56] References Cited

U.S. PATENT DOCUMENTS

| | | | |
|---|---|---|---|
| 4,130,632 | 12/1978 | Braunsperger et al. | 423/342 |
| 4,585,643 | 4/1986 | Barker | 423/342 |
| 4,985,579 | 1/1991 | Bokerman et al. | |
| 5,160,720 | 11/1992 | Halm et al. | 423/342 |
| 5,176,892 | 1/1993 | Halm et al. | 423/342 |
| 5,302,736 | 4/1994 | Kalchauer et al. | 556/477 |

OTHER PUBLICATIONS

Sommer et al., J. Org. Chem., 32:2470–2472 (1967).

*Primary Examiner*—Paul F. Shaver
*Attorney, Agent, or Firm*—William F. Boley

[57] ABSTRACT

A process for recovering chlorine present in a gaseous vent stream. The process comprises contacting a gaseous vent gas comprising hydrogen chloride and a hydrosilane with a chlorination catalyst to form a more chlorinated silane. The chlorination of the hydrosilane captures the chlorine of the hydrogen chloride as a substituent of the resulting chlorosilane and provides for a readily condensable chlorosilane.

12 Claims, No Drawings

TREATMENT OF VENT GAS TO REMOVE HYDROGEN CHLORIDE

BACKGROUND OF INVENTION

Commercial processes associated with the manufacture of semiconductor grade silicon can result in gaseous vent streams which contain hydrogen chloride and hydrosilanes. Both for environmental and economic reasons it is desirable to recover the chloride ion of the hydrogen chloride and to recover the hydrosilanes. The present inventors have found that the recovery of the hydrosilanes and the chloride ion of the hydrogen chloride from the gaseous vent stream can be facilitated by using the hydrogen chloride to chlorinate the hydrosilanes. The process is conducted in the presence of a chlorination catalyst. The present process not only facilitates recovery of the chloride ion of the hydrogen chloride as a substituent of a chlorosilane, but also increases the boiling point of the hydrosilanes by chlorination making them easier to recover by standard processes such as condensation.

Petrov et al., Synthesis of Organosilicon Monomers, Consultants Bureau, N.Y., 1964, p. 416, report that the Si—H bonds of silicon hydrides such as SiH$_4$, SiH$_3$Cl, and CH$_3$SiH$_3$ will react with hydrogen chloride in the presence of AlCl$_3$ to effect chlorination of the silicon hydride.

Sommer et al., J. Org. Chem. 32:2470-2472 (1967) disclose that organosilicon hydrides react with hydrogen halides in the presence of Group VIII metals to form organosilicon halides and hydrogen.

Bokerman et al., U.S. Pat. No. 4,985,579, issued Jan. 15, 1991, describe a process for the removal of hydrogen containing silane impurities from organosilanes with similar boiling points. In the process described by Bokerman et al., the hydrogen-containing silane is reacted with a hydrogen halide in the presence of a catalyst to replace the hydrogen on the silane with a halide and created a modified silane. The substitution of the heavier halide for the hydrogen increases the boiling point of the modified silane to facilitate the separation of the modified silane from the organosilanes having a similar boiling point.

The cited art does not recognize that in a gaseous vent stream containing hydrogen chloride and hydrosilanes, recovery of the hydrosilanes and the chloride ion of the hydrogen chloride can be facilitated by contacting the gaseous vent gas with a chlorination catalyst. Therefore, it is an objective of the present invention to provide a method for recovery of the hydrogen chloride ion of hydrogen chloride from a vent stream also containing hydrosilanes. Furthermore, it is an objective of the present invention to convert the hydrosilanes into higher boiling chlorosilane species thereby increasing their ease of handling and recovery.

SUMMARY OF INVENTION

The present invention is a process for recovering chlorine present in a gaseous vent stream. The process comprises contacting a gaseous vent gas comprising hydrogen chloride and a hydrosilane with a chlorination catalyst to form a more chlorinated silane. The chlorination of the hydrosilane captures the chlorine of the hydrogen chloride as a substituent of the resulting chlorosilane and provides for a readily condensable chlorosilane.

DESCRIPTION OF INVENTION

The present invention is a process for recovering chlorine present in a gaseous vent stream as hydrogen chloride. The process comprises (A) contacting a vent gas comprising hydrogen chloride and a hydrosilane described by formula $$H_a SiCl_{4-a}, \quad (1)$$

where a=1 to 4, with a chlorination catalyst at a temperature within a range of about 30° C. to 400° C. thereby effecting substitution of silicon-bonded hydrogen with chlorine to form a more chlorinated silane, and (B) recovering the more chlorinated silane.

The present invention is a process for recovering chlorine present in a gaseous vent stream as hydrogen chloride. The gaseous vent stream can be, for example, those vent streams typically associated with commercial processes for the production of semiconductor grade silicon. Such commercial processes can include, for example, processes for manufacturing silane and chlorosilanes, redistribution processes for chlorosilanes, hydrogenation processes for forming trichlorosilane from tetrachlorosilane, and chemical vapor deposition processes for forming semiconductor grade silicon. The term "gaseous vent stream" refers generally to gaseous mixtures resulting from such processes as the result of leakage, venting, purging, or other similar processes.

In the present process the gaseous vent stream must comprise hydrogen chloride and hydrosilanes as described by formula 1. The gaseous vent stream may contain other gases such as nitrogen, hydrogen, argon, and the like. The hydrosilanes as described by formula 1 can include silane (SiH$_4$), chlorosilane (ClSiH$_3$), dichlorosilane (Cl$_2$SiH$_2$), trichlorosilane (Cl$_3$SiH), and mixtures thereof. To effect quantitative recovery of the chloride ion of the hydrogen chloride from the gaseous vent stream, it is preferred that the molar ratio of silicon-bonded hydrogen to hydrogen chloride be at least 1:1 in the process. Even more preferred, is when the silicon-bonded hydrogen is present in molar excess in relation to the hydrogen chloride. The amount of molar excess of silicon-bonded hydrogen in relation to the hydrogen chloride is not critical to the present invention and can be those ratio which normally occur in such gaseous vent streams.

The gaseous vent stream comprising the hydrogen chloride and the hydrosilane are contacted with a chlorination catalyst. Contact of the gaseous vent stream with the chlorination catalyst can be effected by standards methods depending upon whether the chlorination catalyst is a homogeneous or a heterogeneous catalyst. The gaseous vent stream can be contacted with heterogeneous chlorination catalysts in, for example, a fixed-bed reactor, a stirred-bed reactor, or a fluidized-bed reactor.

The chlorination catalysts useful in the present process are selected from a group of metals consisting of palladium, platinum, rhodium, ruthenium, nickel, osmium, iridium and compounds thereof. Preferred metals are palladium, platinum, ruthenium, rhodium, and nickel. The term "compounds thereof" includes inorganic compounds, for example, metal salts and oxides, as well as organometallic compounds.

The metal or metal compound can be supported on a solid substrate. The solid substrate can be any inert material of appropriate size and proper affinity for the metal or metal compound, for example, particulate carbon or silica. The preferred substrate is carbon. More preferred is carbon with a surface area of about 1000 $M^2/g$. It is preferred that the metal or metal compound be present on the solid substrate at concentrations from about 0.2 to 10 weight percent. More preferred is when the metal or metal compound is present on the solid substrate at a concentration within a range of about 1.0 to 5.0 weight percent. The inventors believe that metal or metal compound concentrations lower than about 0.2 weight percent may facilitate the reaction of the hydrosilane with the hydrogen chloride; however, with reduced efficiency as evidenced by lower conversions and longer residence times. Conversely, metals or metal compounds at concentrations greater than about 10 weight percent of the support material may be utilized; however, no significant benefit is perceived except in the case of nickel. A useful concentration range for nickel and nickel compounds is about 5 to 15 weight percent of the support material. A preferred concentration of nickel and nickel compounds on the solid support is about 10 weight percent.

Unsupported metals and metal compounds, as described supra, can also function as equivalent catalysts in the described process. The unsupported catalyst can be, for example, a finely divided particulate. A useful concentration range for the unsupported catalyst is about 500 to 10,000 ppm. Although higher concentrations of catalyst will work in the process, there is no perceived advantage. Concentration lower than about 500 ppm of catalyst may work, but with a slower conversion rate.

A preferred chlorination catalyst for use in the present process is palladium supported on carbon. Even more preferred is a chlorination catalyst comprising about one to five weight percent palladium supported on carbon.

The present process can be run at a temperature within a range of about 30° C. to 400° C. The optimum temperature will depend on such factors as the chlorination catalyst used in the process. When the chlorination catalyst comprises about one to five weight percent palladium supported on carbon, a preferred temperature is within a range of about 50° C. to 200° C.

More chlorinated silanes are recovered in the present process. By "more chlorinated silanes" it is meant that one or more silicon-bonded hydrogens of the hydrosilane is replaced by a chlorine atom. The present process is especially useful for facilitating the recovery of lower-boiling hydrosilanes i.e. silane, chlorosilane, and dichlorosilane. Chlorination of these lower-boiling hydrosilanes raises their boiling points thereby making their handling and recovery easier. Recovery of the more chlorinated silanes can be by standard methods, for example, condensation and distillation.

The following example is provided to illustrate the present invention. The example is not intended to limit the scope of the claims herein.

EXAMPLE

A gaseous vent stream collected from several commercial processes practiced in the production of semiconductor grade silicon was passed over a packed-bed of palladium supported on carbon.

A packed bed of 0.5 weight percent palladium on carbon, Englehard Corporation, Iselin, N.J., was formed. The packed bed was about 2.5 cm in diameter and 0.9 meters in length.

The column was heated to a minimum temperature of 50° C., and then a gaseous vent steam compiled from several commercial processes practiced in the production of semiconductor grade silicon was fed to the packed column. Since the chlorination of hydrosilanes is an exothermic reaction, the temperature of the process varied between about 50° C. and 150° C. depending upon the concentration of hydrogen chloride in the gaseous vent stream. Flow rate of the gaseous vent stream to the packed column was within a range of about 10-30 SCFH (Standard Cubic Feet Hour).

The total mole fraction of gases in the gaseous vent stream fed to the packed-bed of chlorination catalyst is provided in Table 1 in the column labelled "Mol. Frac. Inlet." The total mole fraction of gases in the gaseous vent steam exiting the packed bed of chlorination catalyst is provided in Table 1 in the column labelled "Mol. Frac. Outlet." The change in the concentration of a gas after the vent gas passed through the chlorination catalyst bed is provided in Table 1 in the column labelled "%Δ." Analyst of the vent gas was conducted using gas chromatography with a thermal conductivity detector.

TABLE 1

| | Chlorine Recovery As Chlorosilanes | | |
|---|---|---|---|
| Gas | Mol. Frac. Inlet | Mol. Frac. Outlet | % Δ |
| $N_2$ | 0.7793 | 0.8316 | 6.7 |
| HCl | 0.0649 | 0.0007 | −98.9 |
| $H_3SiCl$ | 0.0120 | 0.0001 | −99.1 |
| $H_2SiCl_2$ | 0.0341 | 0.0010 | −97.1 |
| $HSiCl_3$ | 0.0758 | 0.0919 | 21.3 |
| $SiCl_4$ | 0.0350 | 0.0752 | 115.0 |

We claim:

1. A process for recovering chloride ion present in a gaseous vent stream as hydrogen chloride, the process comprising:

(A) contacting a vent gas comprising hydrogen chloride and silanes described by formula $$H_aSiCl_{4-a},$$

where a=1 to 4, with a chlorination catalyst at a temperature within a range of about 30° C. to 400° C. thereby effecting substituting of silicon-bonded hydrogen with chlorine to form a more chlorinated silane, and (B) recovering the more chlorinated silane.

2. A process according to claim 1, where the mole ratio of silicon-bonded hydrogen to hydrogen chloride is at least 1:1.

3. A process according to claim 1, where the silicon-bonded hydrogen is present in molar excess in relation to the hydrogen chloride.

4. A process according to claim 1, where the chlorination catalyst is a metal or metal compound selected from a group of metals consisting of palladium, platinum, rhodium, ruthenium, nickel, osmium, iridium, and compounds thereof.

5. A process according to claim 1, where the chlorination catalyst is a metal or metal compound selected from a group consisting of palladium, platinum, ruthenium, rhodium, and nickel.

6. A process according to claim 4, where the metal or metal compound is supported on a solid substrate.

7. A process according to claim 6, where the metal or metal compound is supported on the solid substrate at a concentration of from about 0.2 to 10 weight percent.

8. A process according to claim 6, where the metal or metal compound is supported on the solid substrate at a concentration of from about one to five weight percent.

9. A process according to claim 6, where the nickel or nickel compound is supported on the solid substrate at a concentration of from about five to 15 weight percent.

10. A process according to claim 1, where the chlorination catalyst is palladium supported on carbon.

11. A process according to claim 10, where about one to five weight percent palladium is supported on the carbon.

12. A process according to claim 11, where the temperature is within a range of about 50° C. to 200° C.

* * * * *